No. 619,754. Patented Feb. 21, 1899.
J. A. HUNTER & H. Y. ARMSTRONG.
MOUSE TRAP.
(Application filed Jan. 26, 1898.)
(No Model.)

Witnesses
J H Busch
C. Johnson

Inventors
James A. Hunter,
Harry Y. Armstrong.
By L. M. Thurlow Atty.

THE NORRIS PETERS CO., PHOTO-LITHO., WASHINGTON, D. C.

UNITED STATES PATENT OFFICE.

JAMES A. HUNTER AND HARRY Y. ARMSTRONG, OF PEORIA, ILLINOIS; SAID ARMSTRONG ASSIGNOR TO SAID HUNTER.

MOUSE-TRAP.

SPECIFICATION forming part of Letters Patent No. 619,754, dated February 21, 1899.

Application filed January 26, 1898. Serial No. 668,087. (No model.)

*To all whom it may concern:*

Be it known that we, JAMES A. HUNTER and HARRY Y. ARMSTRONG, citizens of the United States, residing at Peoria, in the county of Peoria and State of Illinois, have invented certain new and useful Improvements in Mouse-Traps; and we do hereby declare that the following is a full, clear, and exact description of the invention, which will enable others skilled in the art to which it appertains to make and use the same.

This invention pertains to mouse-traps.

The object of the invention is to provide a simple form of trap differently constructed and of different operation than any heretofore used.

Figure 1:
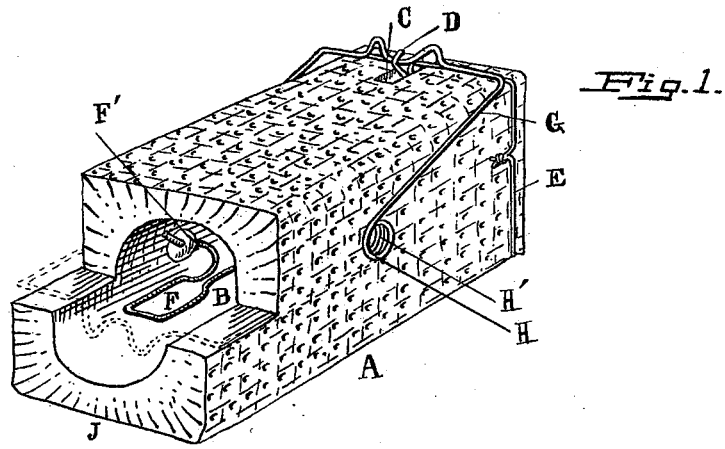
Figure 2:
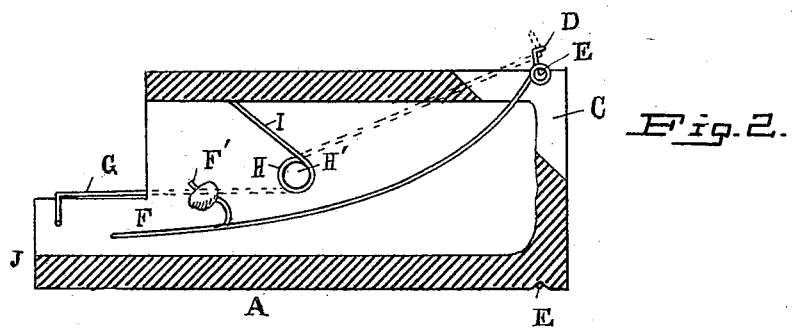

In the drawings, Figure 1 is a perspective view of the trap in its set position. Fig. 2 is a longitudinal sectional elevation of the trap, wherein the different positions are shown.

A represents the body of the trap, made from a corncob. It is provided with a longitudinal bore B. In the top of the trap in the rear is cut a longitudinal slot C, within which is pivotally secured a trigger D by means of a wire E, which surrounds the rear end, serving in the capacity also of a clamp or binding for strengthening that portion.

As shown in Fig. 2, the trigger D merely takes a turn around the wire E, leaving a short hook forming the trigger proper, while the opposite end descends to the lower forward portion of the trap and is bent into a loop at F, while the upturned end forms the bait-hook E'.

A very important point in the construction of this trap is the choking-wire G, which descends from above after the manner of a guillotine instead of working upwardly to choke the victim, as in the old forms of trap. This wire consists of a suitable length bent to form a U, and near each extremity is formed a coil H. A transverse opening H' is bored in each side of the trap, within which is held one of the said coils H, the inner end of each coil bearing upwardly against the top wall of the body A.

In use the wire G is forced back behind the trigger D. The act of placing the said wire behind the trigger necessitates the raising of the treadle F, so that the said trigger may lock the wire or choker in position for action.

In reaching for the bait the mouse naturally rests its fore feet upon the treadle, because the bait is some little distance from the mouth of the trap, and the weight thus thrown upon said treadle releases the wire G, which at once descends.

This trap is simple in construction, novel, and its operation new and results effective. The idea of having the choker-wire occupy the position shown when set and storing up energy for the descent upon the victim and the way in which it is accomplished are new in so far as we are aware. The trigger and treadle being of one piece and having direct locking connection with the choker-wire makes the device positive in action and of original design.

Having thus described our invention, what we claim as new, and desire to secure by Letters Patent, is—

1. In a mouse-trap, the combination with a corncob forming the body thereof, of the longitudinal bore or opening therein, the transverse bores in the sides, the U-shaped choker-wire straddling the top of the trap, when set for operation, the coils H formed near each extremity of the said choker-wire and lying within the transverse openings, the projections I on the inner ends of the coils for the purposes set forth, the trigger pivoted in the top of the trap at the rear end thereof to engage the choker-wire, and the treadle and bait-hook formed with the said trigger as set forth.

2. In a mouse-trap the combination with a corncob forming the body thereof, of the longitudinal bore or opening therein, and the transverse bores in the sides, the projecting lip formed with the trap, the choker-wire with its coiled ends held within the said transverse bores, said wire when locked, occupying a position opposite to that when sprung, being arranged to descend from above, a trigger for the choker-wire and the treadle portion and bait-hook forming part of the said trigger all arranged substantially as described.

In testimony whereof we affix our signatures in presence of two witnesses.

JAMES A. HUNTER.
HARRY Y. ARMSTRONG.

Witnesses:
ROBT. STREHLOW,
RUDOLPH STREHLOW.